United States Patent
Prestenback et al.

(10) Patent No.: US 8,280,223 B2
(45) Date of Patent: Oct. 2, 2012

(54) PLAYBACK OF EPISODIC CONTENT RECORDED ON A PACKAGED MEDIA SET

(75) Inventors: Kyle J. Prestenback, Burbank, CA (US); Jeffrey R. Ashbrook, Burbank, CA (US); Evan H. Tahler, Burbank, CA (US); John T. Bernstein, Los Angeles, CA (US); Allison E. Crow, Berkeley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1008 days.

(21) Appl. No.: 12/260,367

(22) Filed: Oct. 29, 2008

(65) Prior Publication Data
US 2010/0104269 A1    Apr. 29, 2010

(51) Int. Cl.
*H04N 9/80* (2006.01)
(52) U.S. Cl. .................................................. 386/241
(58) Field of Classification Search .................. 386/241, 386/248
See application file for complete search history.

(56) References Cited

U.S. PATENT DOCUMENTS

| | | | |
|---|---|---|---|
| 7,280,746 B2 * | 10/2007 | Noda | 386/230 |
| 2005/0031303 A1 * | 2/2005 | Park | 386/69 |
| 2007/0081798 A1 * | 4/2007 | Peng et al. | 386/126 |
| 2009/0319807 A1 * | 12/2009 | Chasen et al. | 713/193 |

FOREIGN PATENT DOCUMENTS

| | | | |
|---|---|---|---|
| JP | 2002-245709 | * | 8/2002 |
| JP | 2007-172670 | * | 7/2007 |

OTHER PUBLICATIONS

Machine generated translation of JP 2007-172670, Imanishi, Jul. 2007.*

* cited by examiner

*Primary Examiner* — David Harvey

(57) ABSTRACT

A content item having sequential portions, such as episodes, is played back on a packaged media player in a manner that facilitates viewing the sequential portions in sequence. The point at which the user terminated a playback session is marked by storing an indication in memory, so that the user need not remember at what episode or other content portion the user left off. Upon beginning a new playback session, the media player retrieves the marker and navigates to the next content portion in the sequence.

13 Claims, 9 Drawing Sheets

PLAYBACK OF EPISODIC CONTENT RECORDED ON A PACKAGED MEDIA SET

BACKGROUND

The playback of movies, music and other content recorded on optical disks or other packaged media has become commonplace. For example, it is common to insert a prerecorded optical disc into a computer disc drive and use a virtual, i.e., software-based, player to view the content on the computer screen. Integrated video disc players, i.e., machines that have integral screens, can be used similarly. However, the use of computers and computer-like devices to play back content is rooted in the use of standalone players, i.e., player machines that output signals to television screens. Indeed, standalone media players remain quite popular, and it is common for persons to rent or purchase discs to view movies, television shows, and other content through television screens and other home entertainment systems via a standalone player. Newer high-definition (HD) video formats and economical large-screen HD televisions have helped maintain the popularity of this mode of playback.

Videocassette recorders (VCRs) were for many years the dominant type of playback device for consumer use. A VCR is a machine to which a person can connect a television and play back a videocassette, in which the signals are recorded on magnetic tape. Movies, television shows, and other titles were widely available for rental or purchase on the videocassette medium.

Optical disc media have largely supplanted the videocassette. A common optical disc format is known as DVD. The recording medium (disc) itself is known simply as a DVD. A DVD player plays back a DVD in a manner analogous to that in which a VCR plays back a videocassette. However, the DVD format provides a number of improvements, including on-screen menus that a user can navigate using a remote control. When a person inserts a DVD into a DVD player, the player responds not only to recorded video signals but to recorded data files that include predefined commands for generating on-screen displays, such as menus and sub-screens. Upon inserting a DVD, the user is typically presented with a main menu listing one or more options, from which the user can select an option using the remote control. The menu options typically include playing back the movie or other main content item in its entirety, navigating to a selected scene or other sub-portion for playback, and navigating to movie trailers, commentary, or other such "bonus material."

As DVDs that contain serialized or episodic content are popular, a common menu option allows the user to navigate to a specific episode. A common example of serialized or episodic content is the set of episodes from a broadcast season of a television series. It is common for persons to rent or purchase a DVD or set of DVDs that contains one or more season's episodes of a favorite television series, so that the person can view an entire season's episodes in sequence. While this allows one to view each episode at his or her convenience, it is not unusual for one to forget which episode was the last episode viewed. When this occurs, the person may need to briefly view portions of several episodes before identifying the next one to be viewed. The person may feel frustrated by having to conduct this sometimes time-consuming search for the last episode viewed. The problem is compounded in an instance in which the episodes are distributed over more than one disc, as the person may need to skim through episodes on more than one disc before identifying the next episode to be viewed.

A newer generation of optical disc technology provides improved HD video formats and media storage capacity and encompasses so-called "smart" media players. One such technology is known as Blu-ray Disc®, a format administered by the Blu-ray Disc Association, a consortium of consumer electronics, computer, and media manufacturers. Media players that take advantage of advanced features of this newer generation of optical disc technology are referred to as smart media players because they can perform operations that are significantly more complex and computer-like than the simple menu navigation and other operations provided under the DVD standard. This next generation of standards contemplates that media players may include non-volatile data storage, such as solid-state (e.g., flash) memory and magnetic disk drives, as well as programmable processor systems that can execute versatile programming code (such as Java code) read from the disc. In addition, some media players include interfaces for connection to the Internet.

SUMMARY

Embodiments of the present invention relate to a "smart" media player, such as a Blu-ray Disc® player, playing back a content item recorded on one or more packaged media in a manner that facilitates viewing sequential portions (e.g., episodes) of the content item in sequence. Under software control, the media player can store a marker in persistent data storage when the user ejects the disc or otherwise terminates the playback session, and then later query the data storage for the marker when the user re-inserts the disc or otherwise initiates a further playback session of that disc. The media player uses the marker to control navigation to the corresponding portion of the content item, such as the beginning of the next episode in the sequence following the most recently played portion, i.e., following that which was last played back.

In an exemplary embodiment, the marker can identify the disc of a multi-disc set on which the next episode or other content item portion is recorded, as well as the timecode of the point on that disc at which the portion is recorded. The player can prompt the user to load the identified disc, and the player then resumes playback beginning at the next episode.

Embodiments of the present invention relate not only to the playback method but also to the packaged media product that the user loads into the media player, comprising a set of one or more packaged media on which both the content item and some machine-readable code are recorded. The code can instruct the media player to query the persistent data storage to determine if a marker has been stored, control navigation to an episode or other content item portion in response to a stored marker, and then later store such a marker in the persistent data storage in response to termination of the playback session by the user.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
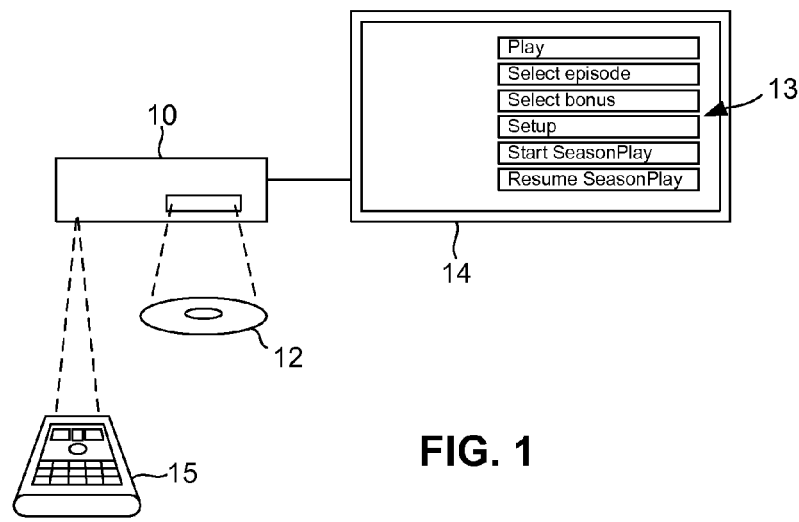
FIG. 1 illustrates a media player playing back a packaged recording medium in accordance with an exemplary embodiment of the invention.
Figure 2:
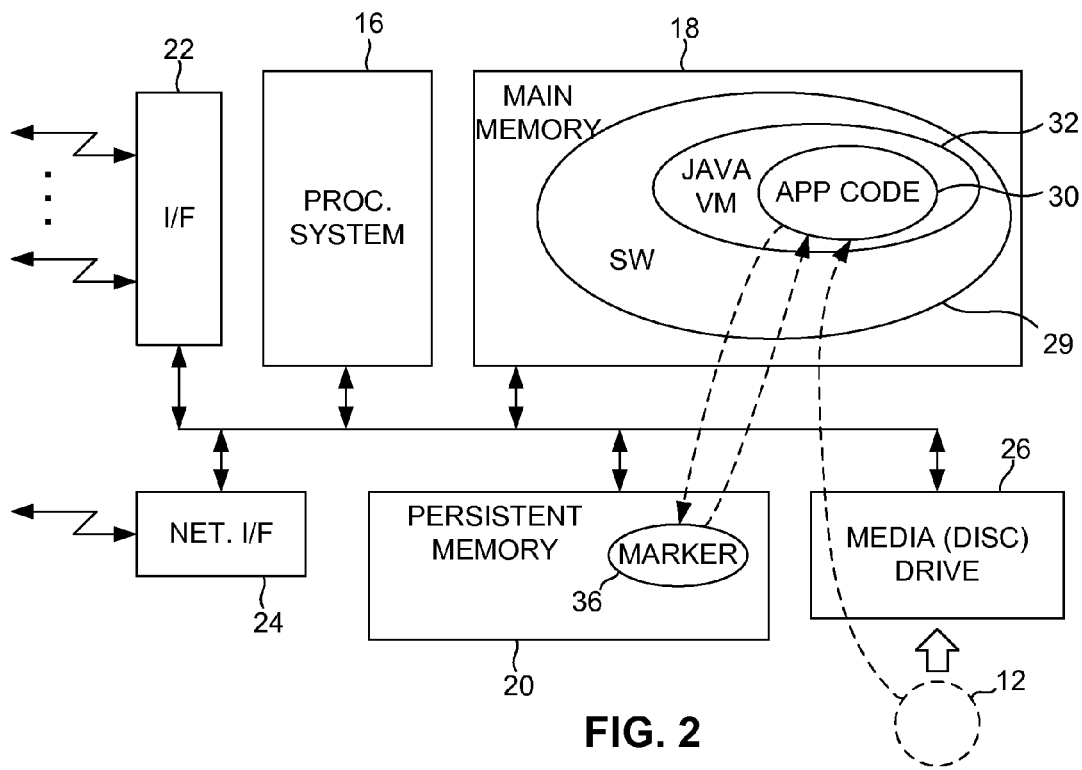
FIG. 2 is a block diagram of the media player in an exemplary embodiment.

As illustrated in FIGS. 1-2, in an illustrative or exemplary embodiment of the invention, a so-called "smart" media player 10, such as a Blu-ray Disc® media player, can play an optical disc 12, on a television display (also referred to as a screen) 14 or similar device to which media player 10 can be connected. A user can interact with media player 10 using a handheld remote control 15 or by pressing buttons (not shown for purposes of clarity) on a control panel of media player 10. Examples of user input that can be provided via remote control 15 or control panel buttons include commands to play a content item that is on disc 12, fast-forward or fast-reverse to a desired point in the content item, navigate through on-screen menus and select menu options, eject disc 12 from media player 10, etc. Some exemplary on-screen main menu options 13 are shown for purposes of illustration.

Although not described in detail in this patent specification ("herein"), it should be understood that a user can use media player 10 in a conventional manner to play any suitable content item. The methods of operation and packaged media products described herein that relate to the present invention can supplement rather than replace those that are conventional. Thus, for example, in the conventional manner a user can insert a conventionally recorded disc (not shown) into media player 10, use remote control 15 to select a "Play" option from on-screen menu 13, and otherwise control media player 10 to view the recorded content item on television display 14. However, as the invention relates to one or more features that facilitate playing back sequential portions (e.g., episodes) of the content item in sequence, the following descriptions are based upon a content item having such sequential portions. For example, the content item can comprise a number of episodes of a television series. As described below, the features obviate the person having to remember which episode was the last one that he or she viewed during a previous playback session.

Although in the exemplary embodiment media player 10 plays optical discs 12, in other embodiments the media player can play any other suitable type of packaged medium. The term "packaged medium" is used herein to refer to a disc or other digital recording medium on which content has been pre-recorded by or at the direction of a party responsible for the production of the disc or its content. Although the term "packaged" medium as used in the art is intended to evoke the commercial manner in which such media are typically provided to consumers who purchase or rent them (i.e., in a box, case or similar commercial packaging), the term "packaged medium" is used herein to mean the recording medium only and does not encompass any packaging materials. The medium can be optical, magnetic, magneto-optical, solid state, or any other suitable type, and can have any suitable physical (non-transitory) form, such as a disc, memory module, etc. In the exemplary embodiment, for example, the medium can be compatible with the Blu-ray Disc® standards. The related term "packaged media product" is used herein to refer to a set of one or more packaged media on which the content item as well as program code for instructing media player 10 are recorded. A packaged media product can include several discs 12, with some episodes stored on different discs 12 in the packaged media set from other episodes. For example, a first disc 12 in a set of such discs 12 can include episodes 1-6 of a television series, a second disc 12 in the set can include episodes 7-12 of the series, etc. (The episode numbering described herein is intended only for purposes of illustration.)

In the exemplary embodiments, media player 10 characteristically includes at least the following computer-like elements that are interconnected via one or more data buses or other suitable means, as shown in FIG. 2: a processor system 16, main or working memory 18, persistent memory or data storage 20, interfaces 22 for connecting television display 14 and other input and output devices, a network interface 24 for connecting media player 10 to the Internet or other network, and a media drive 26. In the exemplary embodiment, media drive 26 is a disc drive that can read discs 12 that a user inserts into it. However, in other embodiments it can be any suitable type of device that can read any suitable type of packaged media. Note that memory 20 is persistent or non-volatile, meaning that it is able to maintain or persist data after termination of a program, process or module that created, used or accessed the data, and may persist data even in the absence of power. Some commercially available media players use flash memory for this purpose. It should be understood that the media player architecture or structure shown in FIG. 2 is intended merely to be representative of a typical smart media player and that such media players can have other suitable architectures and other suitable elements. For example, the buses and interfaces that interconnect certain elements can be structured to facilitate transfer of digital video signals. Furthermore, although an all-digital structure is shown for purposes of illustration, it should be understood that such media players can also include analog inputs and outputs.

In operation, software elements are loaded into memory 18 under control of processor system 16 so that processor system 16 can operate upon such software elements. As indicated in broken line in FIG. 2 and described in further detail below, when a user loads disc 12 into media drive 26, software elements 29 that are stored on disc 12, such as application code 30, are loaded into memory 18. In the exemplary embodiment, application code 30 is in the Java language, and thus can be executed by a Java Virtual Machine (Java VM) 32, which is another software element. The manner in which a Java VM can execute Java code in a processor-based system is well understood in the art and therefore not described herein in further detail. Although in the exemplary embodiment the language of application code 30 is Java, it should be understood that in other embodiments application code 30 can be provided in any other suitable language or format and executed or otherwise acted upon in any other suitable manner.

Software elements recorded on disc 12 can also include data files. In instances in which, for example, the episodes of a television series season are stored on multiple discs 12, an accompanying data file stored on each disc 12 can include locator data comprising a list of episodes and the corresponding discs 12 on which they are stored. For example, the locator data can identify episodes 1-6 as stored on Disc 1 of the set, episodes 7-12 as stored on disc 2 of the set, etc. The locator data can further include the timecode that identifies the playback point on disc 12 at which each episode begins.

Figure 3:
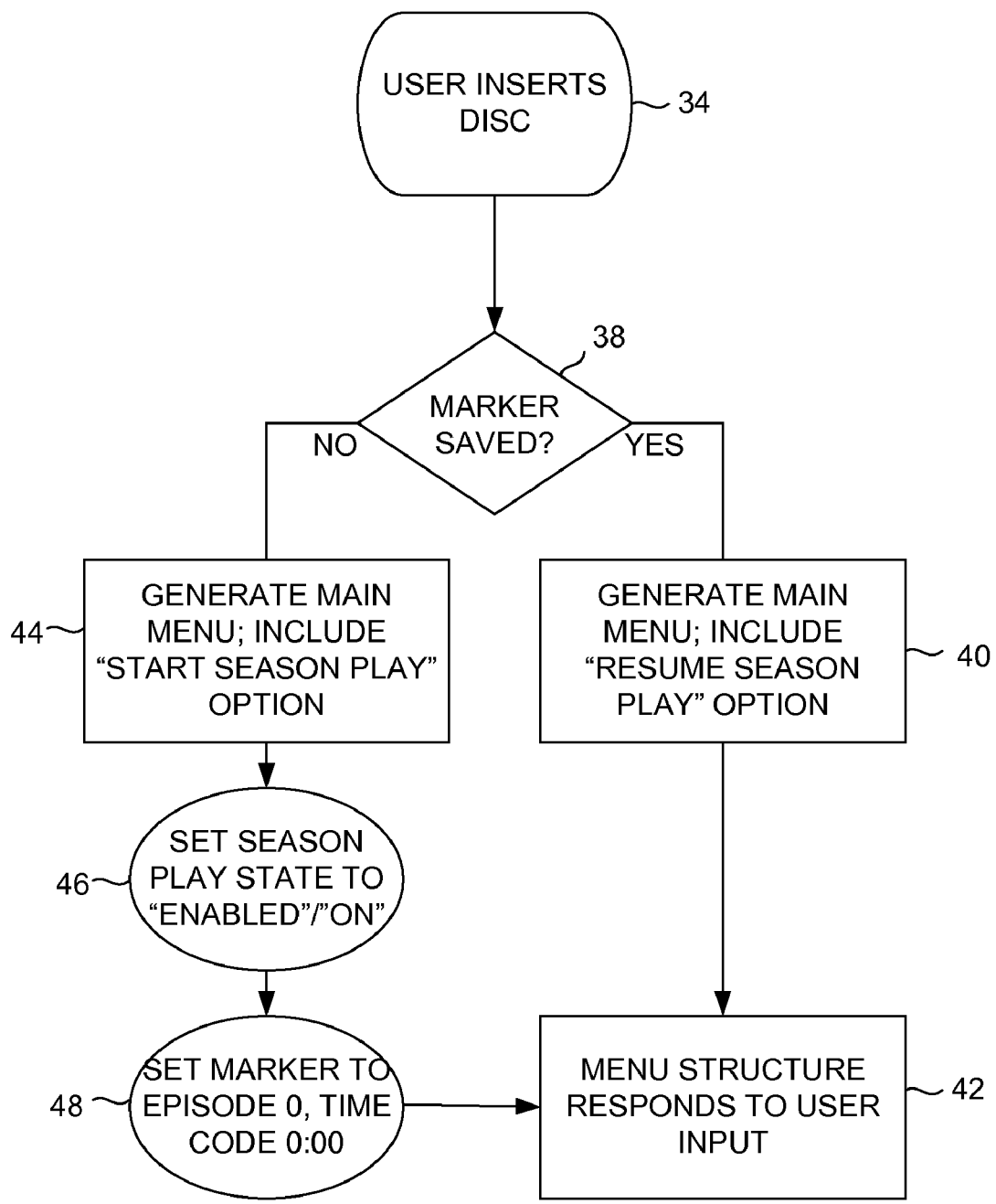
FIG. 3 is a flow diagram, illustrating actions involved in an exemplary method of operation of the media player.

As illustrated in FIG. 3, the method by which media player 10 plays back a content item recorded on disc 12 can begin when, for example, a user loads disc 12 into media player 10, as indicated by block 34, thereby initiating a playback session. Upon insertion of disc 12, media player 10, under the control of so-called "first play logic" (a term used in the Blu-ray community for logic that is included among software elements 29 but not separately shown for purposes of clarity), searches for the first executable code that is stored on disc 12. Thus, when media player 10 finds application code 30, it loads application code 30 into memory 18 and begins to operate under the control of application code 30. Persons skilled in the art to which the invention relates will understand that although application code 30 is shown for purposes of illustration as stored in or residing in memory 18, it may be retrieved in portions (e.g., individual instructions, modules, chunks, etc.) from disc 12 by processor system 16 on an as-needed basis and thus may not actually reside in memory 18 in its entirety at any point in time.

As indicated by block 38, media player 10 first determines if there is any marker 36 that has been saved (i.e., stored) in persistent memory 20 (FIG. 2) during a previous playback session. As memory 20 is persistent, such a marker 36 written to memory 20 would continue to exist in memory 20 even if media player 10 had been powered off in the intervening period, or if the user had viewed other discs in the intervening period. Marker 36 can be included in a data file (not shown for purposes of clarity) along with any other suitable information, such as a disc ID that uniquely identifies a disc to which the file relates. The data file can have any suitable format and can be stored and retrieved in any suitable manner.

If marker 36 is found in memory 20, then media player 10 generates a main menu display that includes a "Resume Season Play" option, as indicated by block 40. The term "Season Play" as used herein refers to the feature that facilitates viewing episodes or other sequential content portions in sequence. If a user turns the Season Play feature off, then media player 10 operates in a conventional manner. If marker 36 is found, then media player 10 generates a main menu display and begins responding to user interaction with the menu structure, as indicated by block 42. Media player 10 causes the main menu to be displayed on television display 14 (FIG. 1).

If marker 36 is not found in memory 20, then media player 10 generates a main menu display that includes a "Start Season Play" option, as indicated by block 44. Although the main menu more preferably includes either a "Resume Season Play" option or a "Start Season Play" option but not both options, for purposes of illustration the main menu display is shown in FIG. 1 as including both a "Resume Season Play" option and a "Start Season Play" option. The absence of marker 36 stored in memory 20 indicates that the content item has not been played previously, i.e., in a previous playback session, with Season Play mode enabled. Media player 10 then turns on or enables the Season Play feature by setting a suitable indicator (e.g., a bit) to an "on" or "enabled" state, as indicated by block 46. Media player 10 also initializes the marker data to indicate episode 0 (i.e., the first episode) and timecode 0:00 (i.e., the beginning of the content item), as indicated by block 48. Note that media player 10 does not yet store the marker data in memory 20.

Season Play mode can also be enabled, i.e., turned on, and disabled, i.e., turned off from a "Setup" sub-menu, which can be accessed as a menu option from the main menu. Alternatively, in other embodiments, such "Enable Season Play" and "Disable Season Play" menu options can be included in the main menu. Whether Season Play mode is enabled or disabled can affect menu options and other logic, as described below.

Figure 4:
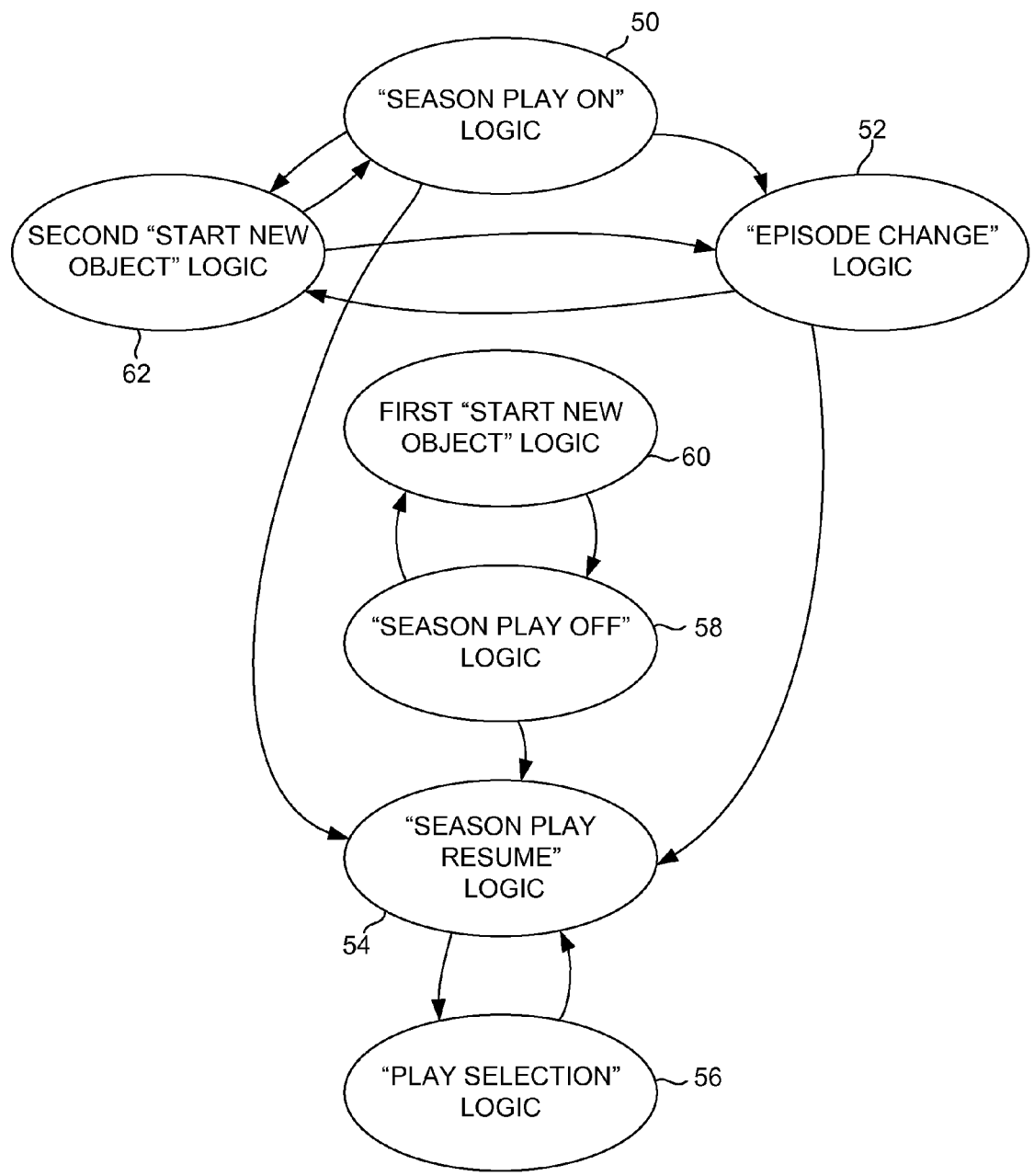
FIG. 4 is an activity diagram, illustrating logical flow among logic modules that reflect the exemplary method of operation of the media player.

As illustrated in FIG. 4, in the exemplary embodiment, application code 30 (FIG. 2) can comprise a number of functional modules that interact with each other. Although in the exemplary embodiment these functional modules are arranged and structured in the manner described below, in other embodiments they can be arranged and structured in any other suitable manner. The modules comprise: a "Season Play On" logic module 50. An "Episode Change" logic module 52, a "Season Play Resume" logic module 54, a "Play Selection" logic module 56, a "Season Play Off" logic module 58, a first "Start New Object" logic module 60, and a second "Start New Object" logic module 62. The arrows in FIG. 4 indicate the manner in which logic modules can invoke and communicate with other logic modules.

Figure 5:
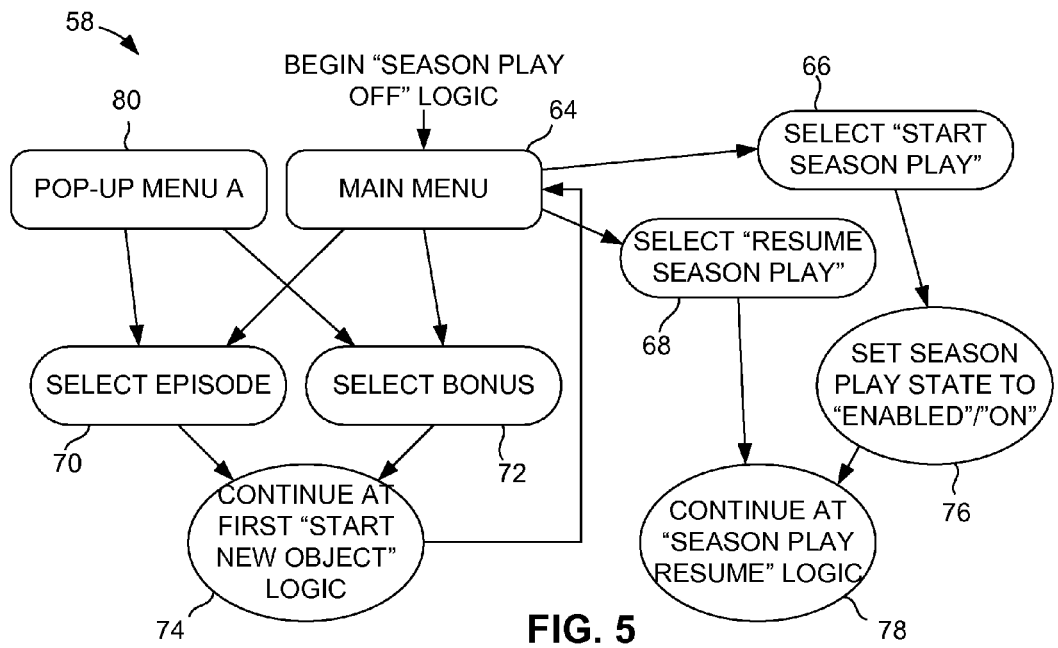
FIG. 5 illustrates a first portion of the exemplary method of operation of the media player in accordance with a "Season Play OFF" logic module.

Exemplary logic of "Season Play Off" logic module 58 (FIG. 4) is shown in FIG. 5. "Season Play Off" logic module 58 is invoked in instances in which Season Play mode is off, i.e., disabled, and media player 10 is causing the main menu to be displayed on television display 14, as indicated by block 64. From the main menu (see main menu options 13, FIG. 1), the user can select the "Start Season Play" option, the "Resume Season Play" option, the "Select Episode" option, or the "Select Bonus" option, as indicated by blocks 66, 68, 70 and 72, respectively. The term "bonus" or "bonus material" refers to secondary content that is associated with the primary content item, such as commentary from actors or the director of the title (e.g., a television series), trailers or other promotional material, outtakes and bloopers, and the like. If the user selects the "Select Episode" option or the "Select Bonus" option, the logical flow continues at first "Start New Object" logic module 60 (FIGS. 4 and 7), as indicated by block 74. If the user selects the "Start Season Play" option, the Season Play state is set to "on" or "enabled," and the logical flow continues at "Season Play Resume" logic module 54 (FIGS. 4 and 9), as indicated by blocks 76 and 78, respectively. If the user selects the "Resume Season Play" option, the logical flow continues at "Season Play Resume" logic module 54, as indicated by block 78.

At any suitable time a user can cause a pop-up menu to appear on television display 14 by, for example, pressing a button on remote control 15 (shown in FIG. 1). In the exemplary logic, there are three pop-up menus: Pop-Up Menu A, Pop-Up Menu B, and Pop-Up Menu C. A pop-up menu is a menu that is overlaid upon whatever is then being displayed and disappears after the user selects an option or exits the menu. Block 80 indicates that if the user causes a pop-up menu to appear while Season Play mode is off, Pop-Up Menu A provides the user with options to select an episode or select bonus material.

Figure 6:
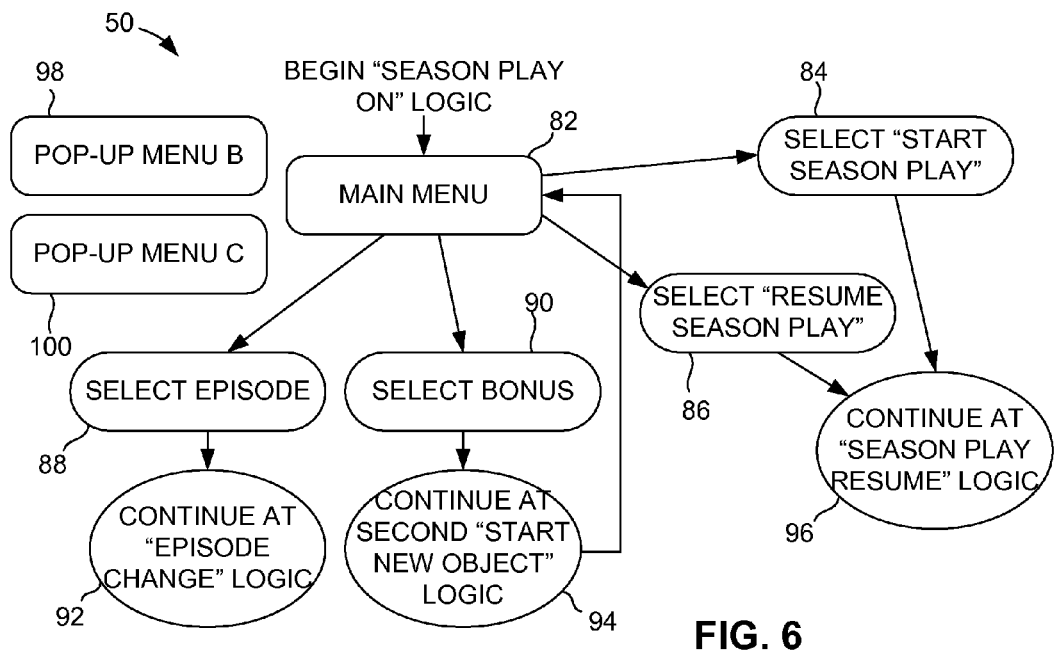
FIG. 6 illustrates a second portion of the exemplary method of operation of the media player in accordance with a "Season Play ON" logic module.

Exemplary logic of "Season Play On" logic module 50 (FIG. 4) is shown in FIG. 6. "Season Play On" logic module 50 is invoked in instances in which Season Play mode is on, i.e., enabled, and media player 10 is causing the main menu to be displayed on television display 14, as indicated by block 82. From the main menu, the user can select the "Start Season Play" option, the "Resume Season Play" option, the "Select Episode" option, or the "Select Bonus" option, as indicated by blocks 84, 86, 88 and 90, respectively. If the user selects the "Select Episode" option, the logical flow continues at "Episode Change" logic module 52 (FIGS. 4 and 10), as indicated by block 92. If the user selects the "Select Bonus" option, the logical flow continues at second "Start New Object" logic module 62 (FIGS. 4 and 8), as indicated by block 94. If the user selects the "Start Season Play" option or the "Resume Season Play" option, the logical flow continues at "Season Play Resume" logic module 54 (FIGS. 4 and 9), as indicated by block 96. If the user causes a pop-up menu to appear, the user is presented with Pop-Up Menu B if Season Play mode is off or Pop-Up Menu C if Season Play mode is on, as indicated by blocks 98 and 100, respectively, and described in further detail below.

Figure 7:
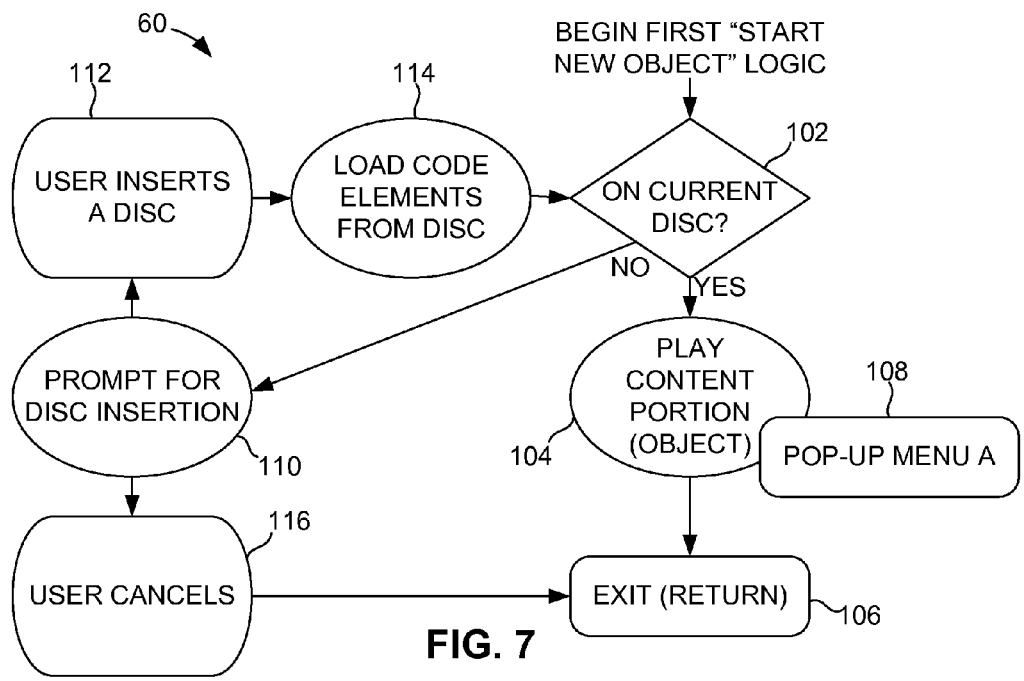
FIG. 7 illustrates a third portion of the exemplary method of operation of the media player in accordance with a first "Start New Object" logic module.

Exemplary logic of first "Start New Object" logic module 60 (FIG. 4) is shown in FIG. 7. This logic relates to ensuring that the disc 12 that has been loaded into media player 10 includes the episode or bonus material (also referred to as an object) that the user has selected. Block 102 represents reading the locator data, which indicates which objects are on which disc in the set, from a data file on disc 12.

If the selected object is on the then-loaded disc 12, media player 10 plays the selected object, i.e., causes the selected episode, bonus material, or other content to be read from disc 12, processed, and displayed on television display 14, as indicated by block 104. The logical flow then returns to the point from which first "Start New Object" logic module 60 was entered, as indicated by block 106. Note that a user can cause Pop-Up Menu A to be displayed while the object is playing, as indicated by block 108.

If the object is not on the then-loaded disc 12, media player 10 causes a text prompt to be displayed on television display 14, identifying the disc 12 on which the selected object is recorded, and instructing the user to load that disc 12, as indicated by block 110. If the user ejects the current disc 12 and inserts a new disc 12, media player 10 reads and loads software from that disc 12, including application code 30 and related data files, and again checks whether the selected object is on the then-loaded disc 12, as indicated by blocks 112 and 114. Block 116 indicates that the user can opt not to load a new disc 12 in response to the prompt and instead cancel the action (e.g., by selecting a Cancel option on a menu or pressing a cancel or exit button to exit out of the menu). In that event, the logical flow returns to the point from which first "Start New Object" logic module 60 was entered, as indicated by block 106.

Figure 8:
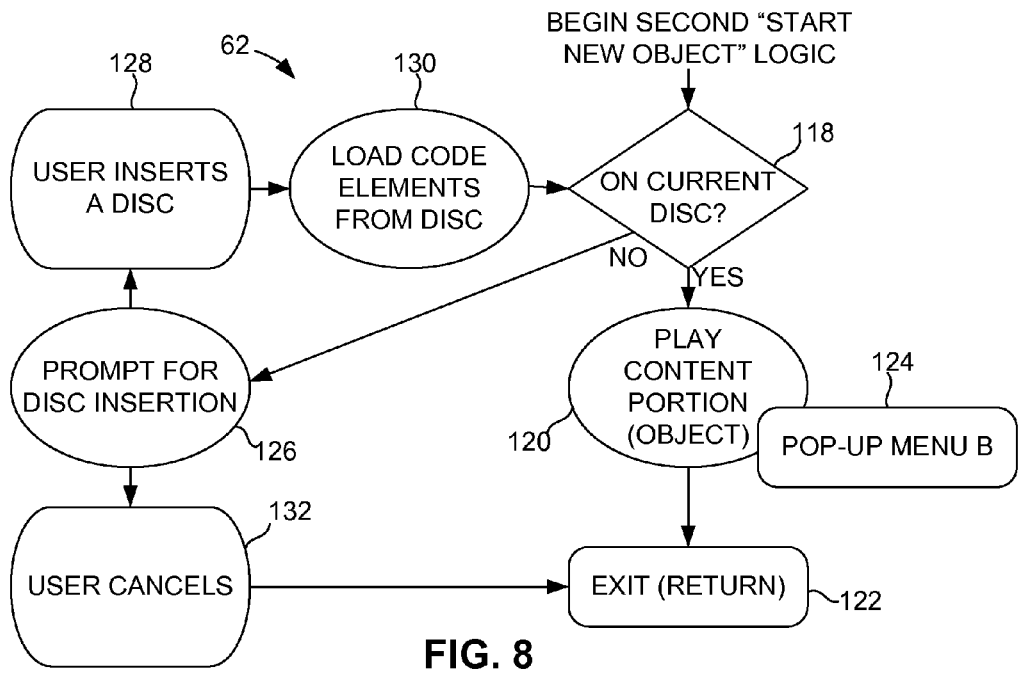
FIG. 8 illustrates a fourth portion of the exemplary method of operation of the media player in accordance with a second "Start New Object" logic module.

Exemplary logic of second "Start New Object" logic module 62 (FIG. 4) is shown in FIG. 8. This logic is essentially the same as that described above for first "Start New Object" logic module 60, but the pop-up menus accessible from them can differ. Blocks 118, 120, 122, 124, 126, 128, 130 and 132 are the same as above-described blocks 102, 104, 106, 108, 110, 112, 114 and 116, respectively. However, note that block 124 in FIG. 8 represents Pop-Up Menu B, while block 108 in FIG. 7 represents Pop-Up Menu A. Although it is suitable for all or some pop-up menus to be identical, in the exemplary embodiment it is contemplated that Pop-Up Menu A can omit certain menu options that relate to the Season Play feature, i.e., playing episodes in sequence, in instances in which, for example, the Season Play feature is turned off or when playing back content that is not episodic or otherwise does not have sequential portions, such as certain bonus material.

Figure 9:
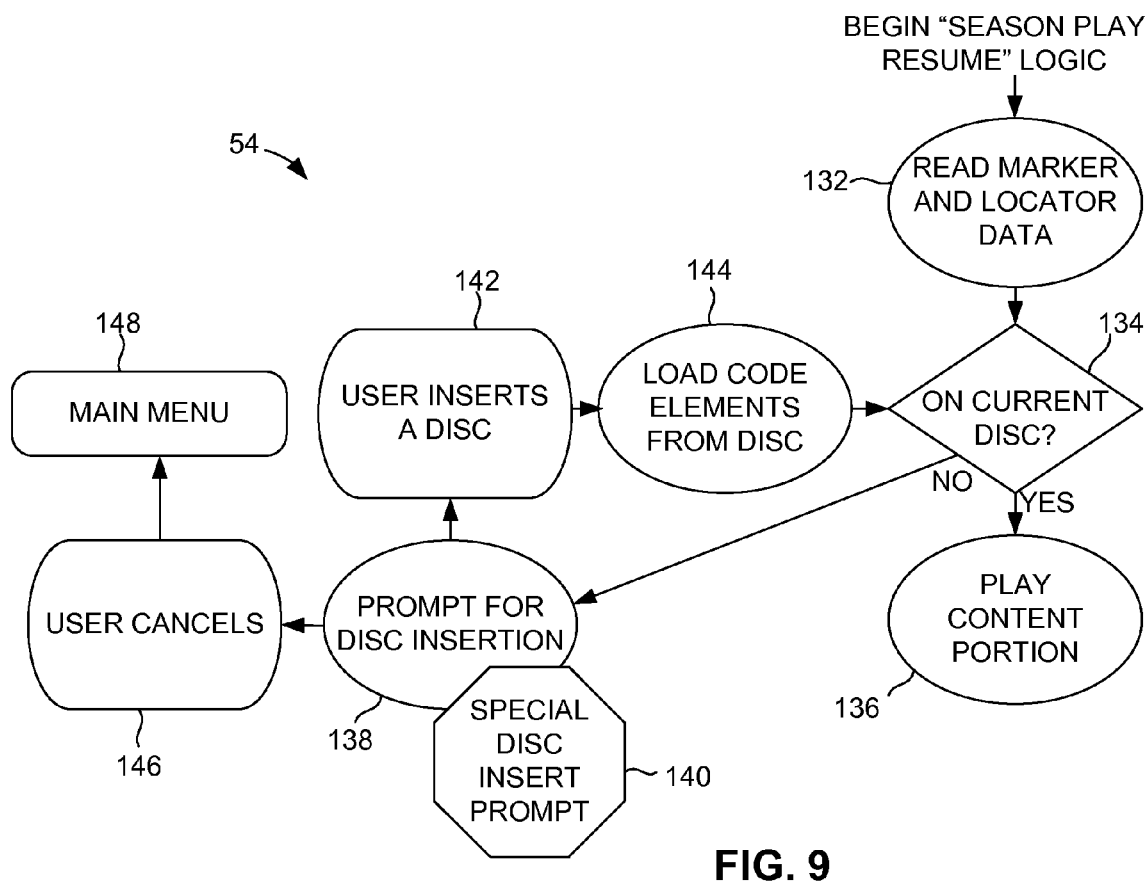
FIG. 9 illustrates a fifth portion of the exemplary method of operation of the media player in accordance with a "Season Play Resume" logic module.

Exemplary logic of second "Season Play Resume" logic module 54 (FIG. 4) is shown in FIG. 9. As indicated by block 132, media player 10 reads marker 36 from persistent memory 20 and locator data from the data file on disc 12. As described above, the stored marker 36 identifies the episode number and timecode of the playback point at which playback was terminated in a previous playback session, i.e., where in the playback sequence the user left off. Alternatively, marker 36 may identify a point at which playback should resume after the previous playback session. As also described above, the locator data identifies which episodes are recorded on which disc in the set. Similarly to the logic described above with regard to FIGS. 7 and 8, the logic shown in FIG. 9 relates to ensuring that the then-loaded disc 12 contains the episode or other content item portion that is next in the playback sequence. For example, if the user left off before an episode ended, the logic ensures that the same disc 12 is loaded, so that the user can finish viewing that episode. If the user left off after an episode ended but before the next episode began, the logic ensures that the disc 12 containing the next episode is loaded.

If, as indicated by block 134, it is determined that the episode or other content item portion that is to be played next in accordance with the sequence is on the then-loaded disc 12, then the logical flow continues at "Play Selection" logic module 56 (FIGS. 4 and 11), as indicated by block 136. If the episode or other next content item portion is not on the then-loaded disc 12, media player 10 causes a text prompt to be displayed on television display 14, identifying the disc 12 on which that next content item portion is recorded, and instructing the user to load that disc 12, as indicated by block 138. As indicated by block 140, a "Special Disc Insert Prompt" can be substituted for this prompt in instances in which the last episode that was played was the last episode on the then-loaded disc 12. This special prompt can include information about the previously played episodes on the then-loaded disc 12 or other information about previously played episodes. For example, the information can comprise a representative still image or short video clip from each episode. In this manner, the user can refresh his or her memory about the episode or episodes previously viewed, in preparation for viewing the episodes on the next disc 12.

If the user ejects the current disc 12 and inserts a new disc 12, media player 10 reads and loads software from that disc 12, including application code 30 and related data files, and again checks whether the selected object is on the then-loaded disc 12, as indicated by blocks 142 and 144. Block 146 indicates that the user can opt not to load a new disc 12 in response to the prompt and instead cancel the action (e.g., by selecting a Cancel option on a menu or pressing a cancel or exit button to exit out of the menu). In that event, the logical flow returns to the main menu, as indicated by block 148.

Figure 10:
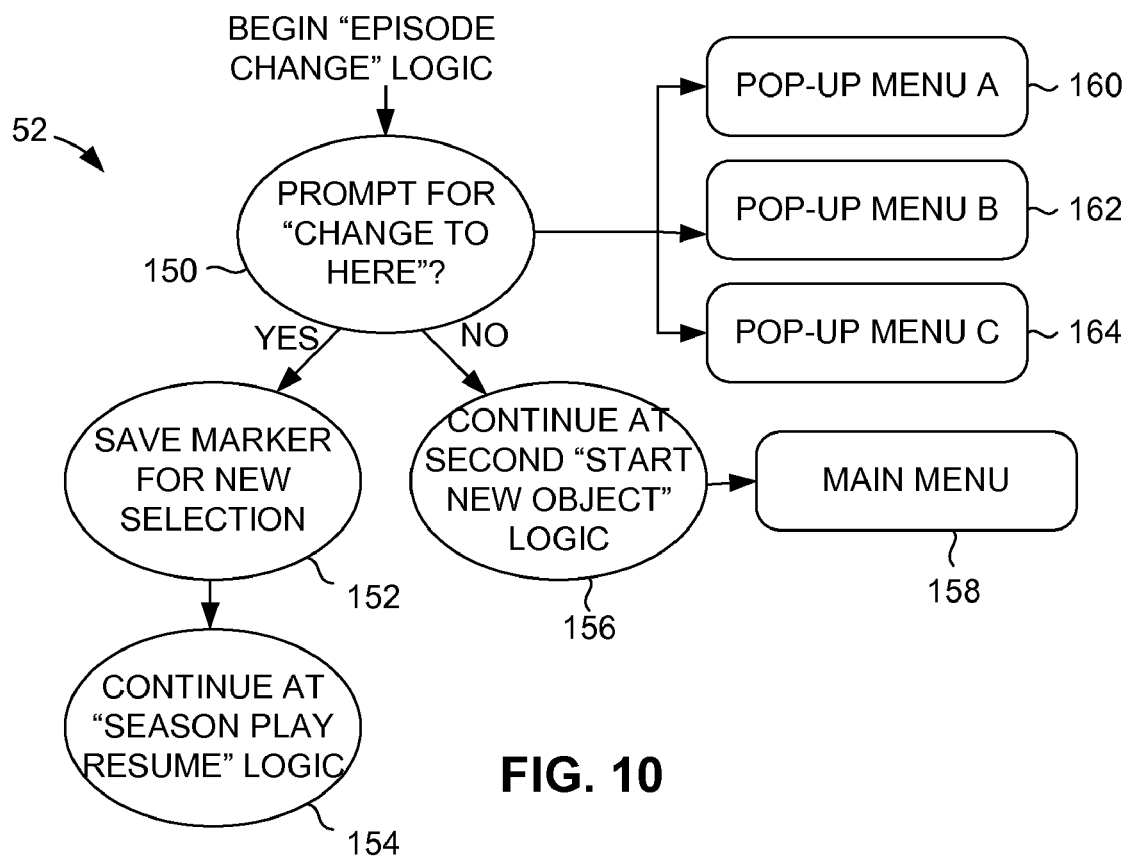
FIG. 10 illustrates a sixth portion of the exemplary method of operation of the media player in accordance with a "Episode Change" logic module.

Exemplary logic of "Episode Change" logic module 52 (FIG. 4) is shown in FIG. 10. This logic relates to an instance in which the user wishes to view an episode in Season Play mode other than the episode indicated by marker 36, i.e., other than the episode at which the user left off. The logic is invoked when a user has selected the new episode in Season Play mode. As indicated by block 150, media player 10 causes a text prompt to be displayed, requesting that the user confirm his or her desire to view the new episode in Season Play mode. If the user selects a prompt indicating confirmation, then media player 10 saves or stores a marker 36 in memory 20 that indicates the newly selected episode, and the logical flow continues at "Season Play Resume" logic module 54 (FIGS. 4 and 9), as indicated by blocks 152 and 154. If the user does not confirm, i.e., does not wish to view the new episode in Season Play mode, then the logical flow continues at second "Start New Object" logic module 62 (FIGS. 4 and 8), as indicated by block 156. As indicated by block 158, when the logical flow returns from second "Start New Object" logic module 62, the main menu is displayed. Note that instead of inputting a response to the prompt, the user can opt to cause a pop-menu to be displayed, as indicated by blocks 160, 162 and 164. Which of Pop-Up Menus A, B and C is displayed depends upon the state of the system (e.g., whether in Season Play mode, etc.), as described above.

Figure 11:
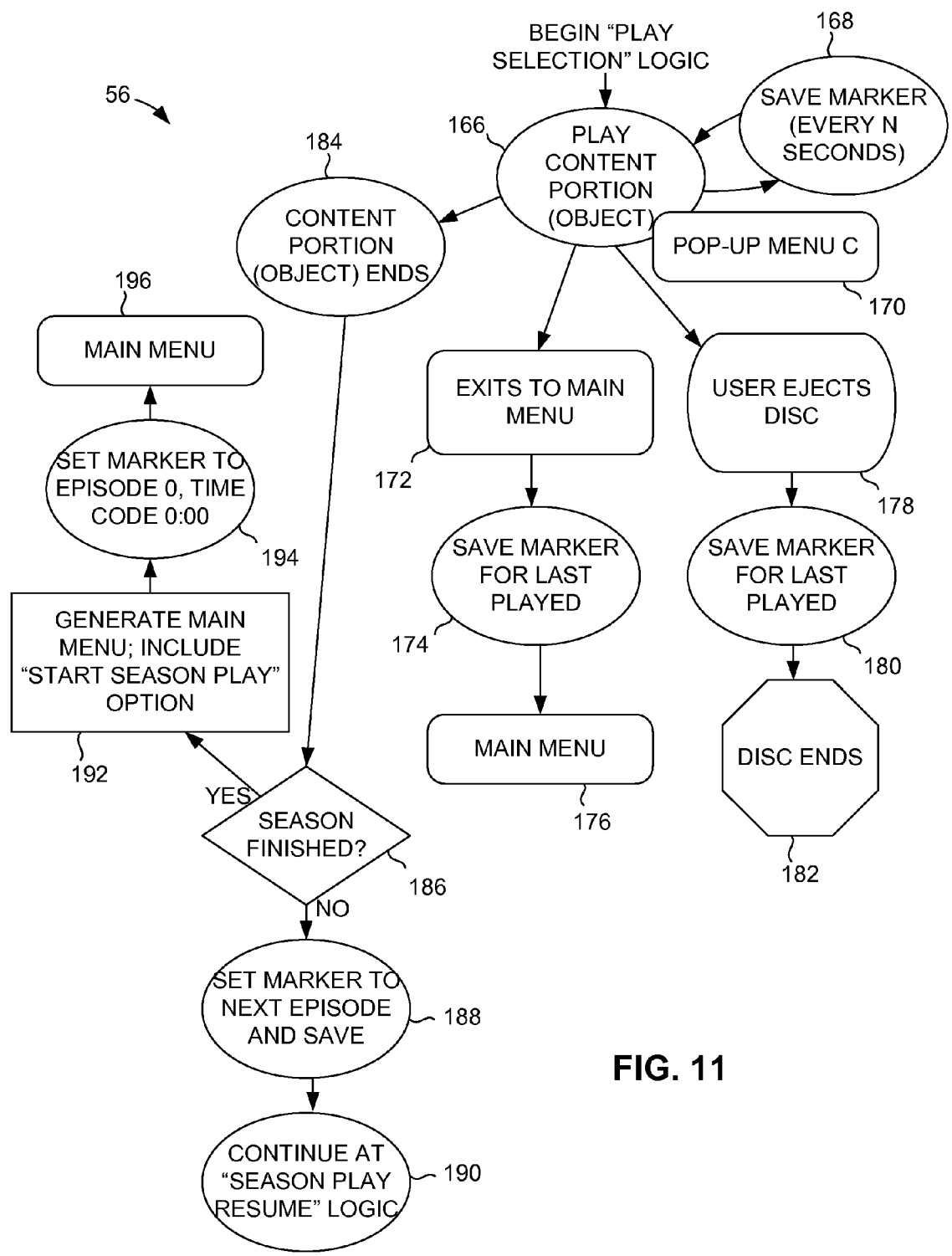
FIG. 11 illustrates a seventh portion of the exemplary method of operation of the media player in accordance with a "Play Selection" logic module.

Exemplary logic of "Play Selection" logic module 56 (FIG. 4) is shown in FIG. 11. As indicated by block 166, media player 10 plays the selected object, i.e., causes the selected episode, bonus material, or other content to be read from disc 12, processed, and displayed on television display 14 in the conventional manner. To prevent loss of information in the event of a power outage or similar event, the marker data (i.e., episode number and timecode) is saved periodically during playback, as indicated by block 168. If the user causes a pop-up menu to be displayed during playback, Pop-Up Menu C is displayed, as indicated by block 170. If the user exits playback, thereby returning to the main menu, media player 10 saves marker 36 in memory 20, as indicated by blocks 172, 174 and 176. Similarly, if the user commands media player 10 to eject disc 12 during playback, media player 10 saves marker 36 in memory 20 and returns to displaying the main menu, as indicated by blocks 178, 180 and 182.

Playback can also terminate by virtue of reaching the end of the content portion (e.g., episode) being played back, as indicated by block 184. In that event, it is then determined whether the episode or other content item portion is the last in the season or other such sequential set of episodes of which the content item is comprised, as indicated by step 186. If the content item portion is not the last in the sequence (e.g., there are more episodes in the season that have not yet been played back), then the marker data is set to the next episode (e.g., an episode number is incremented), and marker 36 is saved in memory 20, as indicated by step 188. The logical flow then continues at "Season Play Resume" logic module 54 (FIGS. 4 and 9). If the content item portion is the last in the sequence (e.g., all episodes in a season have been played back), then media player 10 generates a main menu display that includes a "Start Season Play" option, as indicated by block 192. In addition, media player 10 resets the marker data to the first episode (Episode 0) and timecode 0:00, and returns to displaying the main menu, as indicated by blocks 194 and 196.

Figure 12:
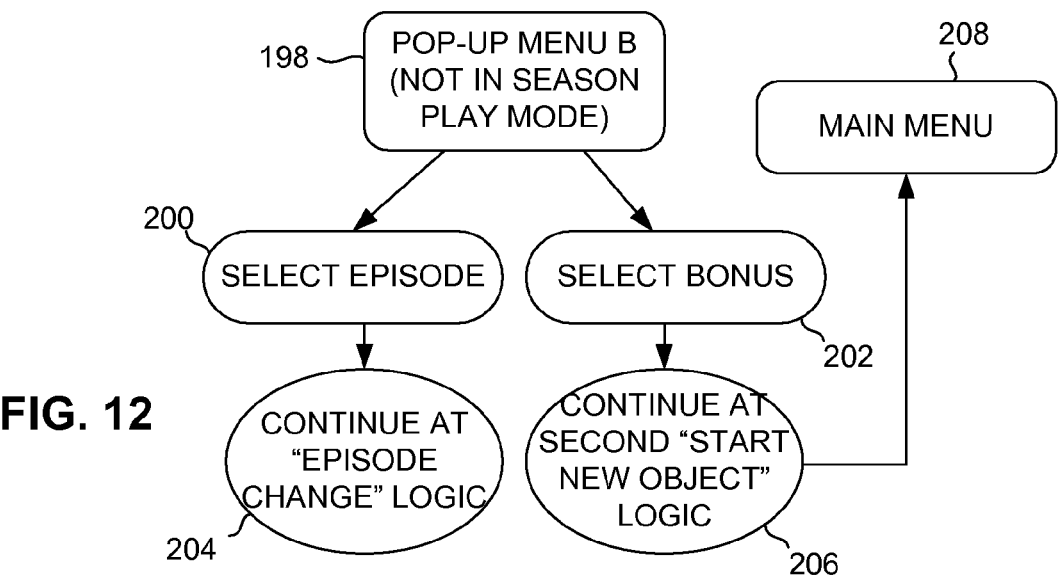
FIG. 12 illustrates an eighth portion of the exemplary method of operation of the media player in accordance with a "Pop-Up Menu B" logic module.

Exemplary logic of the above-referenced Pop-Up Menu B is shown in FIG. 12. As indicated by blocks 198, 200 and 202, Pop-Up Menu B includes at least two options: "Select Episode" and "Select Bonus." If the user selects the "Select Episode" option, then the logical flow continues at "Episode Change" logic module 52 (FIGS. 4 and 10), as indicated by block 204. If the user selects the "Select Bonus" option, then the logical flow continues at second "Start New Object" logic module 62 (FIGS. 4 and 8), as indicated by block 206. As indicated by block 208, when the logical flow returns from second "Start New Object" logic module 62, the main menu is displayed.

Figure 13:
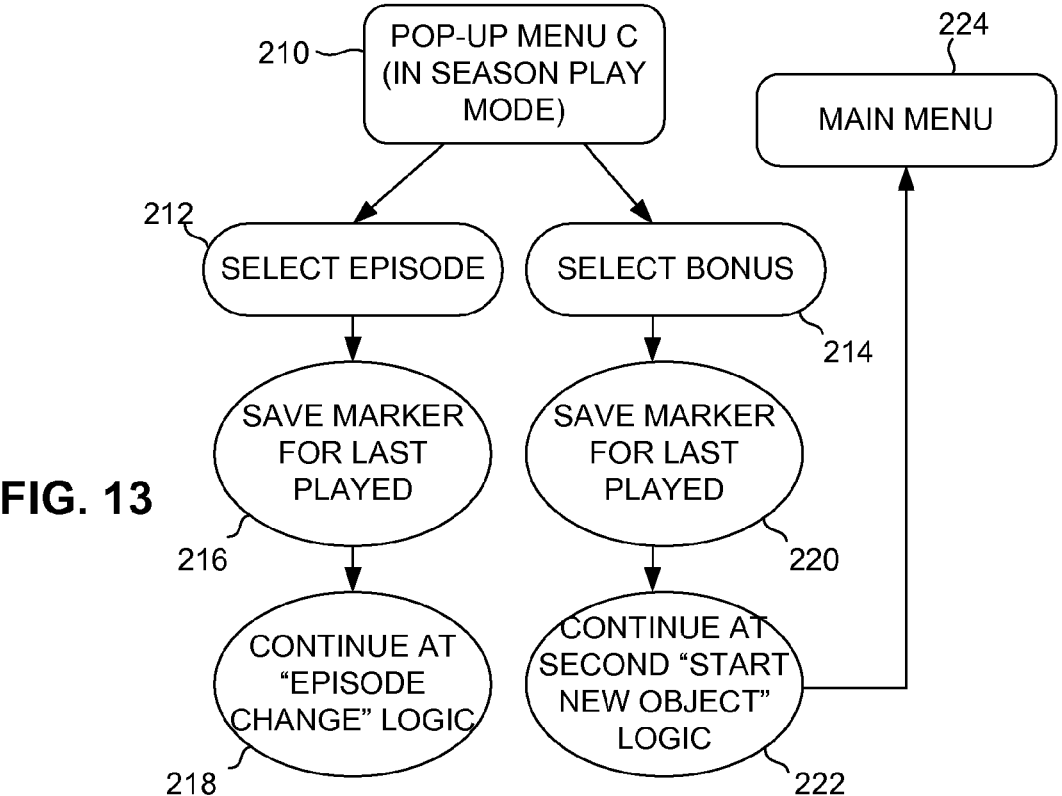
FIG. 13 illustrates a ninth portion of the exemplary method of operation of the media player in accordance with a "Pop-Up Menu C" logic module.

Exemplary logic of the above-referenced Pop-Up Menu C is shown in FIG. 13. As indicated by blocks 210, 212 and 214, Pop-Up Menu C includes at least two options: "Select Episode" and "Select Bonus." If the user selects the "Select Episode" option, then media player 10 saves or stores marker 36, indicating the last episode or other content item portion played, in memory 20, and the logical flow continues at "Episode Change" logic module 52 (FIGS. 4 and 10), as indicated by blocks 216 and 218, respectively. If the user selects the "Select Bonus" option, then media player 10 saves or stores marker 36, indicating the last episode or other content item portion played, in memory 20, and the logical flow continues at second "Start New Object" logic module 62 (FIGS. 4 and 8), as indicated by blocks 220 and 222, respectively. As indicated by block 224, when the logical flow returns from second "Start New Object" logic module 62, the main menu is displayed.

While one or more embodiments of the invention have been described as illustrative of or examples of the invention, it will be apparent to those of ordinary skill in the art that other embodiments and implementations are possible that are within the scope of the invention. Accordingly, the scope of the invention is not to be limited by such embodiments but rather is determined by the appended claims.

What is claimed is:

1. A method for a media player to play back a content item recorded on packaged media, the content item being distributed over a packaged media set comprising a plurality of the packaged media, with some portions of the content item stored on different packaged media in the packaged media set from other portions of the content item, the method comprising:
   reading code recorded on one of the packaged media loaded in the media player, the code including locator data identifying on which packaged medium in the packaged media set a portion of the content item is stored;
   performing instructions under control of a processor system in accordance with the code to:
      query a data storage device to determine if a marker is stored in the data storage device;
      control playback of the content item, including controlling navigation to a portion of the content item in response to a stored marker and in response to the locator data; and
      store in the data storage device a marker in response to termination of playback by a user, the stored marker associated with a most recently played portion of the content item.

2. The method claimed in claim 1, wherein:
   the content item comprises a sequence of episodes;
   the portion of the content item is an episode; and
   the marker is associated with a most recently played episode.

3. The method claimed in claim 1, wherein performing instructions under control of a processor system in accordance with the code to control playback of the content item comprises:
   receiving user input indicating to resume playback following the most recently played portion of the content item;
   identifying, in response to the locator data, a packaged medium in the packaged media set corresponding to a portion of the content item following the most recently played portion of the content item;

determining if the packaged medium loaded in the media player is the identified packaged medium; and providing user output instructing a user to load the identified packaged medium into the media player if the packaged medium loaded in the player is not the identified packaged medium.

4. The method claimed in claim 3, wherein:

the content item comprises a sequence of episodes;

the portion of the content item is an episode; and the marker is associated with a most recently played episode.

5. The method claimed in claim 4, wherein, if it is determined that the packaged medium loaded in the media player is not the identified packaged medium, the user output further comprises information about previously played episodes of the content item.

6. The method claimed in claim 5, wherein the information about previously played episodes of the content item comprises a still image from each previously played episode on the packaged medium loaded in the media player.

7. A packaged media product for playback on a media player, the packaged media product comprising a packaged media set of two or more packaged media on which is recorded in machine-readable form a content item distributed over the packaged media of the packaged media set and code for instructing the media player to:

query a data storage device to determine if a marker is stored in the data storage device;

control playback of the content item, including controlling navigation to a portion of the content item in response to a stored marker and in response to locator data included in the code, the locator data identifying on which packaged medium in the packaged media set is the portion of the content items stored; and store in the data storage device a marker in response to termination of playback by a user, the stored marker associated with a most recently played portion of the content item.

8. The packaged media product claimed in claim 7, wherein:

the content item comprises a sequence of episodes;

the portion of the content item is an episode; and the marker is associated with a most recently played episode.

9. The packaged media product claimed in claim 7, wherein the code for instructing the media player to control playback of the content item comprises code for instructing the media player to:

receive user input indicating to resume playback following the most recently played portion of the content item;

identify, in response to the locator data, a packaged medium in the packaged media set corresponding to a portion of the content item following the most recently played portion of the content item;

determine if the packaged medium loaded in the media player is the identified packaged medium; and provide user output instructing a user to load the identified packaged medium into the media player if the packaged medium loaded in the player is not the identified packaged medium.

10. The packaged media product claimed in claim 9, wherein:

the content item comprises a sequence of episodes;

the portion of the content item is an episode; and the marker is associated with a most recently played episode.

11. The packaged media product claimed in claim 9, wherein, if it is determined that the packaged medium loaded in the player is not the identified packaged medium, the user output further comprises information about previously played episodes of the content item.

12. The packaged media product claimed in claim 11, wherein the information about previously played episodes of the content item comprises a still image from each previously played episode on the packaged medium loaded in the media player.

13. A media player operable to play a packaged media set of two or more packaged media on which is recorded in machine-readable form a content item, the content item being distributed over the packaged media of the packaged media set, with some portions of the content item stored on different packaged media in the packaged media set from other portions of the content item, the media player comprising:

memory;

a processor coupled to the memory and configured to execute first code, second code and third code read from one of the packaged media loaded in the media player; and a data storage device;

wherein the first code is executable on the processor to cause the media player to query the data storage device to determine if a marker is stored in the data storage device;

wherein the second code is executable on the processor to control playback of the content item, including controlling navigation to a portion of the content item in response to a stored marker, the second code including locator data identifying on which packaged medium in the packaged media set is the portion of the content item stored; and wherein the third code is executable on the processor to cause the media player to store a marker during a first playback session in the data storage device, the stored marker indicating a location in the content item to resume play during a second playback session.

* * * * *